(12) United States Patent
Son et al.

(10) Patent No.: US 10,926,656 B2
(45) Date of Patent: Feb. 23, 2021

(54) VEHICLE AND METHOD FOR CONTROLLING THE SAME

(71) Applicants: Hyundai Motor Company, Seoul (KR); Kia Motors Corporation, Seoul (KR)

(72) Inventors: Seungwan Son, Gyeonggi-Do (KR); Jungsoo Park, Incheon (KR); Kyujin Lee, Seoul (KR); Dong Jun Shin, Gyeonggi-do (KR); Kyoungcheol Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 43 days.

(21) Appl. No.: 16/294,047

(22) Filed: Mar. 6, 2019

(65) Prior Publication Data

US 2020/0130525 A1    Apr. 30, 2020

(30) Foreign Application Priority Data

Oct. 24, 2018  (KR) .......................... 10-2018-0127354

(51) Int. Cl.
| | |
|---|---|
| *B60L 53/51* | (2019.01) |
| *H02J 7/35* | (2006.01) |
| *B60L 58/12* | (2019.01) |
| *B60K 6/28* | (2007.10) |

(52) U.S. Cl.
CPC .............. *B60L 53/51* (2019.02); *B60L 58/12* (2019.02); *H02J 7/35* (2013.01); *B60K 6/28* (2013.01); *B60Y 2200/91* (2013.01); *B60Y 2200/92* (2013.01)

(58) Field of Classification Search
CPC .. B60L 53/51; B60L 58/12; H02J 7/35; B60K 6/28; B60Y 2200/91; B60Y 2200/92
See application file for complete search history.

(56) References Cited

U.S. PATENT DOCUMENTS

| | | | |
|---|---|---|---|
| 2011/0089887 A1* | 4/2011 | Ward ...................... | B60L 8/003 320/101 |
| 2015/0280487 A1* | 10/2015 | Nakazawa .............. | B60L 50/40 320/101 |
| 2017/0267113 A1* | 9/2017 | Harada ................... | H02J 7/007 |
| 2018/0201150 A1* | 7/2018 | Kubo .................. | B60W 50/082 |

* cited by examiner

*Primary Examiner* — Jeffrey M Shin
(74) *Attorney, Agent, or Firm* — Mintz Levin Cohn Ferris Glovsky and Popeo, P.C.; Peter F. Corless

(57) ABSTRACT

A vehicle for supplying solar charging panel generated power to a high-voltage battery or an auxiliary battery based on a SOC is provided. The vehicle includes a motor, an electric field load, a high-voltage battery that supplies power to the motor, and an auxiliary battery that supplies the power to the electric field load. A battery sensor measures a SOC of each battery. A solar charging panel measures an amount of solar light and generates the power based on solar energy. A controller calculates generable power through the solar charging panel based on the measured amount of light when starting of the vehicle is off. The solar charging panel is operated to generate power when the generable power is greater than the power consumption in the power generation through the solar charging panel, and supplies the generated power to one of the batteries based on the SOC of each.

18 Claims, 13 Drawing Sheets

FIG. 5

| HIGH-VOLTAGE BATTERY / AUXILIARY BATTERY | IS EQUAL TO OR GREATER THAN REFERENCE SOC | IS LESS THAN REFERENCE SOC |
|---|---|---|
| IS EQUAL TO OR GREATER THAN REFERENCE SOC | AUXILIARY BATTERY PRIORITY CHARGE | HIGH-VOLTAGE BATTERY PRIORITY CHARGE |
| IS LESS THAN REFERENCE SOC | AUXILIARY BATTERY PRIORITY CHARGE | AUXILIARY BATTERY PRIORITY CHARGE |

VEHICLE AND METHOD FOR CONTROLLING THE SAME

CROSS-REFERENCE TO RELATED APPLICATION(S)

This application is based on and claims priority under 35 U.S.C. § 119 to Korean Patent Application No. 10-2018-0127354, filed on Oct. 24, 2018, the disclosure of which is incorporated by reference in its entirety.

TECHNICAL FIELD

The present disclosure relates to a vehicle control method, and more particularly, to a vehicle that supplies power generated through a solar charging panel disposed on the vehicle to a high-voltage battery and an auxiliary battery.

BACKGROUND

An electric vehicle (EV) and a hybrid electric vehicle (HEV), which are eco-friendly vehicles, are driven by the power of a motor. In particular, the eco-friendly vehicles are operated by the power of the motor, and thus, it is necessary to use a high-voltage large-capacity battery (hereinafter, referred to as a high-voltage battery) and a low-voltage direct current-direct current (DC-DC) converter (LDC) that charges an auxiliary battery by converting a voltage of the high-voltage battery to a low voltage. The auxiliary battery generally refers to a vehicle battery that supplies power for starting various electrical components of the vehicle. In recent years, studies have been actively conducted regarding utilizing solar energy charged by mounting a solar charging panel on the top of the eco-friendly vehicle for each configuration of the vehicle.

SUMMARY

Therefore, it is an aspect of the present disclosure to provide a vehicle for supplying power generated through a solar charging panel to a high-voltage battery or an auxiliary battery based on a state of charge (SOC) of each of the high-voltage battery and the auxiliary battery, and a method for controlling the same. Additional aspects of the disclosure will be set forth in part in the description which follows and, in part, will be obvious from the description, or may be learned by practice of the disclosure.

In accordance with an aspect of the present disclosure, a vehicle may include: a motor; an electric field load; a high-voltage battery configured to supply power to the motor; an auxiliary battery configured to supply the power to the electric field load; a battery sensor configured to measure a SOC of the high-voltage battery and the SOC of the auxiliary battery; a solar charging panel configured to measure an amount of solar light and generate the power based on solar energy; and a controller configured to calculate generable power through the solar charging panel based on the measured amount of light when starting of the vehicle is off, operate the solar charging panel to generate the power when the generable power is greater than the power consumption in the power generation through the solar charging panel, and operate the solar charging panel to supply the generated power to the high-voltage battery or the auxiliary battery based on the SOC of the high-voltage battery and the SOC of the auxiliary battery.

The controller may be configured to operate the solar charging panel to supply the generated power to the high-voltage battery when the auxiliary battery is charged and the SOC of the auxiliary battery reaches the maximum SOC, and operate the solar charging panel to supply the generated power to the auxiliary battery when the auxiliary battery is discharged and the SOC of the auxiliary battery reaches a predetermined normal control lower limit SOC. The controller may further be configured to operate the solar charging panel to supply the generated power to the auxiliary battery when the SOC of the high-voltage battery is equal to or greater than a predetermined first reference SOC and the SOC of the auxiliary battery is equal to or greater than a predetermined second reference SOC.

Additionally, the controller may be configured to operate the solar charging panel to supply the generated power to the high-voltage battery until the auxiliary battery is discharged and the SOC of the auxiliary battery reaches a predetermined first threshold SOC when the SOC of the auxiliary battery is equal to or less than the maximum SOC and is equal to or greater than a predetermined normal control lower limit SOC, and operate the solar charging panel to supply the generated power to the auxiliary battery when the SOC of the auxiliary battery reaches the first threshold SOC. The controller may be configured to operate the solar charging panel to supply the generated power to the auxiliary battery when the SOC of the auxiliary battery is less than a predetermined normal control lower limit SOC and is equal to or greater than the second reference SOC. The controller may also be configured to operate the solar charging panel to supply the generated power to the high-voltage battery when the SOC of the high-voltage battery is less than a predetermined first reference SOC and the SOC of the auxiliary battery is less than a predetermined second reference SOC.

Further, the controller may be configured to operate the solar charging panel to supply the generated power to the auxiliary battery when the auxiliary battery is discharged and the SOC of the auxiliary battery reaches the second reference SOC. The controller may be configured to operate the solar charging panel to supply the generated power to the auxiliary battery when the high-voltage battery is charged and the SOC of the high-voltage battery reaches the first reference SOC. In addition, the controller may be configured to operate the solar charging panel to supply the generated power to the auxiliary battery when the SOC of the high-voltage battery is equal to or greater than a predetermined first reference SOC and the SOC of the auxiliary battery is less than a predetermined second reference SOC. The controller may be configured to operate the solar charging panel to supply the generated power to the auxiliary battery when the SOC of the high-voltage battery is less than a predetermined first reference SOC and the SOC of the auxiliary battery is less than a predetermined second reference SOC.

The controller may be configured to operate the solar charging panel to supply the generated power to the high-voltage battery when the auxiliary battery is charged and the SOC of the auxiliary battery reaches a predetermined second threshold SOC, and operate the solar charging panel to supply the generated power to the auxiliary battery when the auxiliary battery is discharged and the SOC of the auxiliary battery reaches the second reference SOC. The controller may further be configured to charge the solar charging panel to supply the generated power to the auxiliary battery when the high-voltage battery is charged and the SOC of the high-voltage battery reaches the first reference SOC. The controller may be configured to charge the solar charging panel to supply the generated power to the high-voltage battery when the auxiliary battery is charged and the SOC of the auxiliary battery reaches the maximum SOC, and control the solar charging panel to supply the generated power to the auxiliary battery when the high-voltage battery is charged and the SOC of the high-voltage battery reaches the maximum SOC.

In accordance with another aspect of the present disclosure, a method for controlling a vehicle is provided, wherein the vehicle includes a motor, an electric field load, a high-voltage battery configured to supply power to the motor, an auxiliary battery configured to supply the power to the electric field load, a battery sensor configured to measure a SOC of the high-voltage battery and the SOC of the auxiliary battery, and a solar charging panel configured to measure an amount of solar light and generate the power based on solar energy. The method may include: calculating generable power through the solar charging panel based on the measured amount of light when starting of the vehicle is off; operating the solar charging panel to generate the power when the generable power is greater than the power consumption in the power generation through the solar charging panel; and operating the solar charging panel to supply the generated power to the high-voltage battery or the auxiliary battery based on the SOC of the high-voltage battery and the SOC of the auxiliary battery.

The operating of the solar charging panel may include operating the solar charging panel to supply the generated power to the high-voltage battery when the auxiliary battery is charged and the SOC of the auxiliary battery reaches the maximum SOC; and operating the solar charging panel to supply the generated power to the auxiliary battery when the auxiliary battery is discharged and the SOC of the auxiliary battery reaches a predetermined normal control lower limit SOC. Additionally, the operating of the solar charging panel may include operating the solar charging panel to supply the generated power to the auxiliary battery when the SOC of the high-voltage battery is equal to or greater than a predetermined first reference SOC and the SOC of the auxiliary battery is equal to or greater than a predetermined second reference SOC.

The operating of the solar charging panel may include operating the solar charging panel to supply the generated power to the high-voltage battery until the auxiliary battery is discharged and the SOC of the auxiliary battery reaches a predetermined first threshold SOC when the SOC of the auxiliary battery is equal to or less than the maximum SOC and is equal to or greater than a predetermined normal control lower limit SOC; and operating the solar charging panel to supply the generated power to the auxiliary battery when the SOC of the auxiliary battery reaches the first threshold SOC.

Further, the operating of the solar charging panel may include operating the solar charging panel to supply the generated power to the auxiliary battery when the SOC of the auxiliary battery is less than a predetermined normal control lower limit SOC and is equal to or greater than the second reference SOC. The operating of the solar charging panel may include operating the solar charging panel to supply the generated power to the high-voltage battery when the SOC of the high-voltage battery is less than a predetermined first reference SOC and the SOC of the auxiliary battery is less than a predetermined second reference SOC. The operating of the solar charging panel may include operating the solar charging panel to supply the generated power to the auxiliary battery when the auxiliary battery is discharged and the SOC of the auxiliary battery reaches the second reference SOC.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 is a view illustrating battery charging priority in the vehicle according to an exemplary embodiment of the present disclosure;

DETAILED DESCRIPTION

Figure 1:
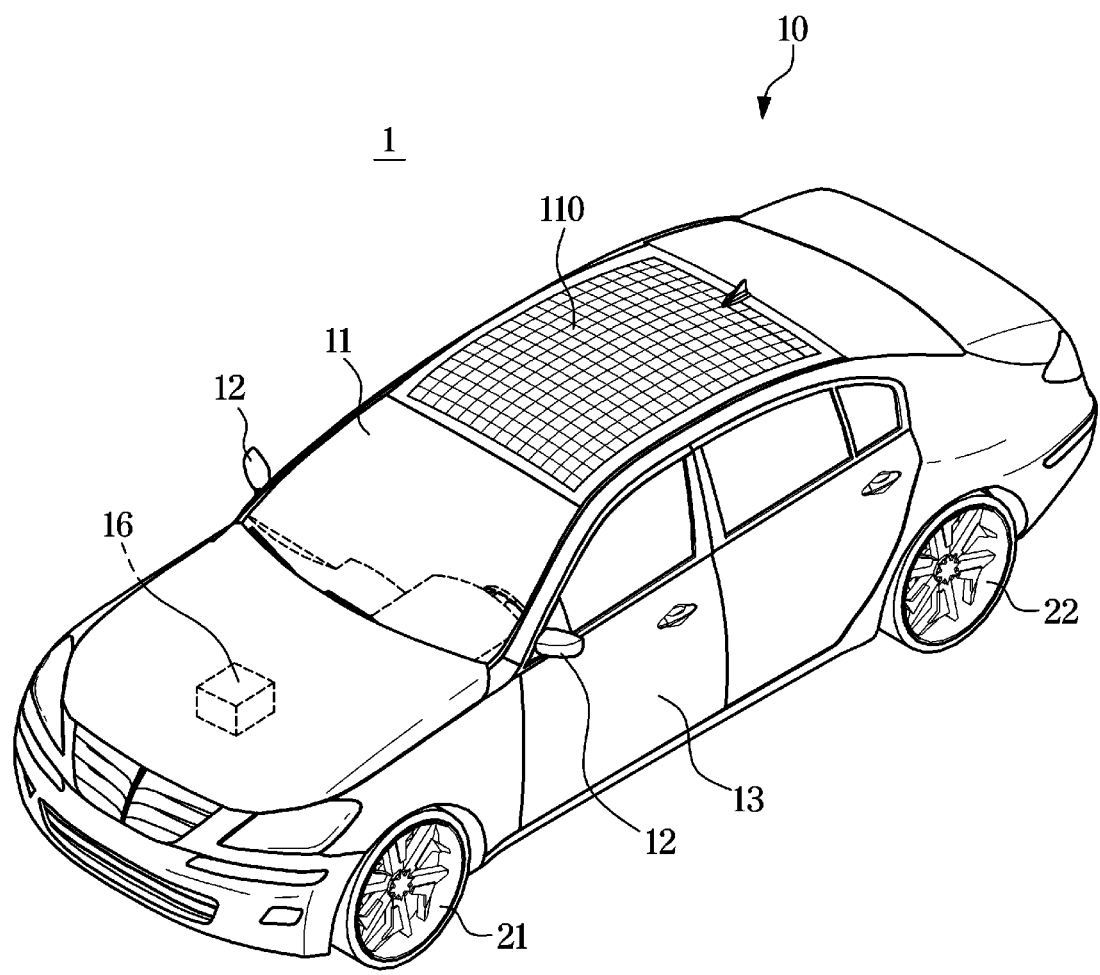
FIG. 1 is a view illustrating an appearance of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor.

The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout the specification. Not all elements of exemplary embodiments of the present disclosure will be described, and description of what are commonly known in the art or what overlap each other in the embodiments will be omitted. Throughout this specification, when a part is referred to as being "connected" to another part, it includes not only a direct connection but also an indirect connection, and the indirect connection includes a connection through a wireless communication network.

Further, the terms "~ part," "~ er," "~ block," "~ module," and the like may refer to a unit for processing at least one function or operation. For example, these terms may refer to at least one process which is performed by at least one piece of hardware such as a field-programmable gate array (FPGA) and an application specific integrated circuit (ASIC), at least one piece of software stored in a memory, or a processor. A reference numeral, which is assigned to each step, is used for discriminating each step and does not describe the order of the steps, and these steps may be differently performed from the described order unless clearly specified in the context.

Hereinafter, exemplary embodiments of a vehicle and a method for controlling the same according to an aspect will be described in detail with reference to the accompanying drawings.

FIG. 1 is a view illustrating an appearance of a vehicle according to an exemplary embodiment. Referring to FIG. 1, the vehicle 1 may include a body 10 that forms the appearance (e.g., the shape or mold) of the vehicle 1, a windscreen 11 that provides a front view of the vehicle 1 to a driver, side mirrors 12 that provides a rear side view of the vehicle 1 to the driver, doors 13 that protects the inside of the vehicle 1 from the outside, and vehicle wheels 21 and 22 that move the vehicle 1 by including the front wheels 21 disposed on a front side of the vehicle and the rear wheels 22 disposed on a rear side of the vehicle.

The windscreen 11 may be disposed on an upper portion of the front of the body 10 to allow the driver inside the vehicle 1 to acquire visual information regarding the front of the vehicle 1. The side mirrors 12 may include a left side mirror disposed on the left side of the body 10 and a right side mirror disposed on the right side of the body 10, and may allow the driver inside the vehicle 1 to acquire visual information of the lateral side and the rear side of the vehicle 1. The doors 13 may be rotatably disposed on a right side and a left side of the body 10. When the door 13 is opened, the driver may enter the vehicle 1, and when the door 13 is closed, the inside of the vehicle 1 may be shielded from the outside.

In addition to above-mentioned components, the vehicle 1 may include a driving device (not shown) configured to rotate the wheels 21 and 22, a steering system (not shown) configured to change the driving direction of the vehicle 1, and a brake system (not shown) configured to stop the driving of the wheels. A driving device 16 may be configured to supply torque to the front wheels 21 or the rear wheels 22 to move the body 10 forward and backward. The driving device 16 may include at least one of an engine configured to generate torque by burning the fuel or a motor 180 (see FIG. 2) configured to generate torque by receiving power from a high-voltage battery 120 (see FIG. 2).

Figure 2:
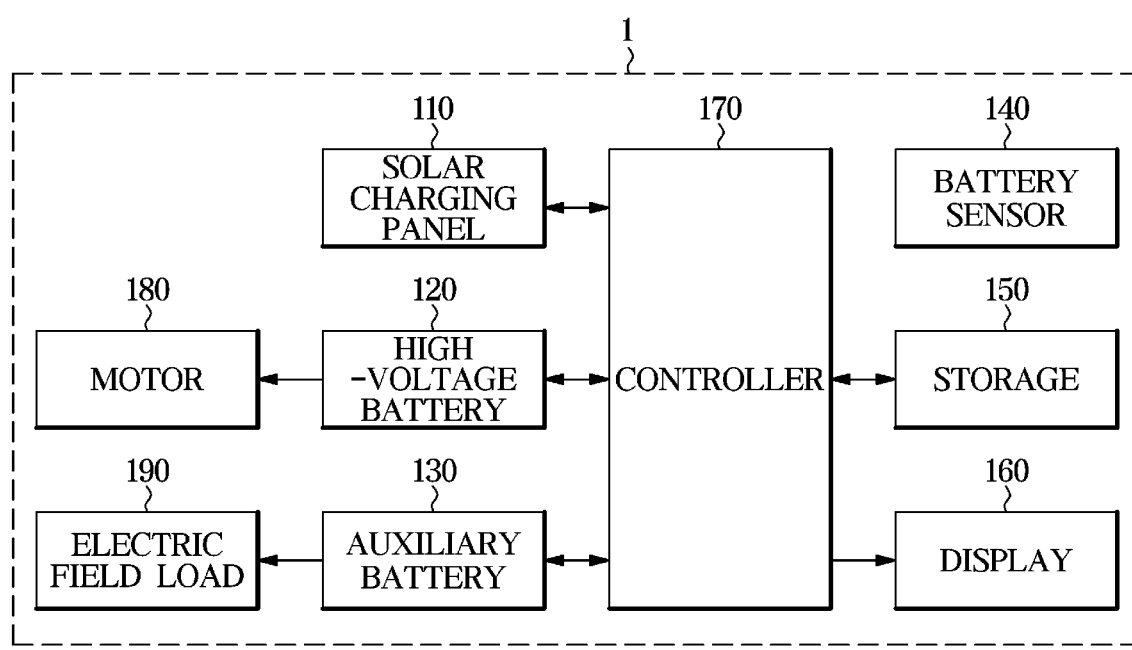
FIG. 2 is a control block diagram of the vehicle according to an exemplary embodiment of the present disclosure.

In other words, the vehicle 1 corresponds to an electric vehicle (EV) or a hybrid electric vehicle (HEV) and may include the motor 180 (see FIG. 2). When the vehicle 1 corresponds to the HEV, the vehicle 1 may further include the engine. The steering system may include a steering wheel (not shown) that receives a driving direction from the driver, a steering gear (not shown) that changes a rotary motion of the steering wheel to a reciprocating motion, and a steering link (not shown) that delivers the reciprocating motion of the steering gear (not shown) to the front wheels 21. Accordingly, the steering system may change the driving direction of the vehicle 1 by changing the direction of a rotary axis of the wheels.

The brake system may include a brake pedal (not shown) that receives a brake operation from the driver, a brake drum (not shown) coupled to the wheels 21 and 22, and a brake shoe (not shown) that stops the rotation of the brake drum (not shown) by using friction force. Accordingly, the brake system may be configured to decelerate and stop the driving of the vehicle 1 by stopping the rotation of the wheels 21 and 22. Additionally, a solar charging panel 17 may be mounted on a roof of the vehicle 1 as a configuration for charging solar energy, however, the mounting position is not limited thereto. A detailed description thereof will be given later.

FIG. 2 is a control block diagram of the vehicle according to an exemplary embodiment. Referring to FIG. 2, the vehicle 1 may include a solar charging panel 110 configured to measure an amount of solar light and generate power based on solar energy, the high-voltage battery 120 configured to supply the power to the motor 180, an auxiliary battery 130 configured to supply the power to an electric field load 190, a battery sensor 140 configured to measure a state of charge (SOC) of the high-voltage battery 120 and the SOC of the auxiliary battery 130, a storage 150 configured to store various information necessary for driving the vehicle 1, a display 160 configured to display the SOC of the high-voltage battery 120, a controller 170 configured to calculate generable power through the solar charging panel 110 based on the measured amount of light.

Additionally, the controller may be configured to operate the solar charging panel 110 to generate the power when the generable power is greater than the power consumption during the power generation when starting of the vehicle 1 is off and operate the solar charging panel 110 to supply the generated power to the high-voltage battery 120 or the auxiliary battery 130 based on the SOC of the high-voltage battery 120 and the SOC of the auxiliary battery 130. The vehicle may further include the motor 180 configured to provide a rotational force to the front wheels 21 or the rear wheels 22 corresponding to the driving device 16, and the electric field load 190 configured to perform various functions of the vehicle 1. When a driver turns on an ignition, the starting of the vehicle is in an on state. And, when the driver turn off the ignition, the starting of the vehicle is in an off state.

The solar charging panel 110 may be configured to charge the solar energy into the high-voltage battery 120 and the auxiliary battery 130 (e.g., transmit solar energy to the batteries). The solar charging panel 110 may be configured to apply a power generation system that converts the solar energy directly into power (current) by a solar cell, and the solar cell may be formed to convert light energy into electrical energy. The solar cell may include a p-type semiconductor and an n-type semiconductor, and when the light is irradiated, an electric charge moves to generate a potential difference. When the solar cell is mounted on the roof of the vehicle, electrical energy may be generated using natural light supplied from the sun. In other words, the solar charging panel 110 may be constructed of the solar cell to generate the power based on solar energy.

In addition, the solar charging panel 110 may be configured to measure the amount of solar light. Particularly, the solar charging panel 110 may be configured to measure the amount of solar light based on the power generated in proportion to the amount of solar light. In other words, the solar charging panel 110 may be configured to measure the amount of solar light based on the intensity of the generated power. In addition, the solar charging panel 110 may include a light intensity measuring sensor (not shown) configured to measure the amount of solar light. The solar charging panel 110 may be operated by the controller 170 to supply the generated power to the high-voltage battery 120 or the auxiliary battery 130 when the starting of the vehicle 1 is off. Accordingly, the high-voltage battery 120 or the auxiliary battery 130 may be charged based on the power supplied from the solar charging panel 110.

The position where the solar charging panel 110 is mounted on the vehicle 1 is not limited to the roof, and the solar charging panel 110 may be mounted at any position on the vehicle 1 where capable of charging the battery. The high-voltage battery 120 may be configured to supply the power to the motor 180 that provides a rotational force to the wheels 21 and 22. In other words, the high-voltage battery 120 may be configured to store the power for driving the motor 180, and may correspond to the high-voltage large-capacity battery for driving the motor 180. The high-voltage battery 120 may be a lithium battery. The auxiliary battery 130 may be referred to as a low-voltage battery and may be configured to supply the power required for starting the engine of the vehicle 1 and the power consumed in the electric field load 190 (electrical component).

The battery sensor 140 may be configured to measure the state of charge (SOC) of each of the high-voltage battery 120 and the auxiliary battery 130 by measuring the voltage, current, and temperature of the high-voltage battery 120 and the auxiliary battery 130. The SOC may indicate the capacity difference between the current battery and the fully charged battery. As described above, the battery sensor 140 may be provided in a plurality of units and may be disposed at each terminal of the high-voltage battery 120 and the auxiliary battery 130 to measure the input power or the output power. Accordingly, each of the battery sensors 140 may be constructed of a current sensor, a voltage sensor, or the like.

Additionally, the storage 150 may be configured to store various information related to the operations of the vehicle 1. Particularly, the storage 150 may be configured to store information on the reference SOC of the high-voltage battery 120. At this time, the reference SOC of the high-voltage battery 120 may be preset and stored during the design stage and may be used to determine a supply priority to the auxiliary battery 130 when supplying the power generated by the solar charging panel 110. When the SOC of the high-voltage battery 120 falls below the reference SOC, when the vehicle 1 corresponds to the hybrid vehicle, the high-voltage battery 120 may be charged using the electrical energy generated by motor regeneration based on a margin output of the engine of the vehicle 1. The storage 150 may be configured to store information regarding the reference SOC, a normal control lower limit SOC, a first threshold SOC, and a second threshold SOC of the auxiliary battery 130.

The reference SOC of the auxiliary battery 130 may refer to the minimum SOC for protecting the auxiliary battery 130 since the measurement of the remaining SOC of the auxiliary battery 130 becomes inaccurate when the SOC falls below the reference SOC. In other words, the reference SOC of the auxiliary battery 130 may be preset and stored during the design stage, and may be used to determine the supply priority to the high-voltage battery 120 when supplying the power generated by the solar charging panel 110.

The normal control lower limit SOC of the auxiliary battery 130 may refer to a lower limit SOC of the steady state in which optimum power is supplied to the electric field load 190. The first threshold SOC and the second threshold SOC of the auxiliary battery 130 may be preset and stored during the design stage, and may be used to determine the supply priority to the high-voltage battery 120 when supplying the power generated by the solar charging panel 110. In addition, the storage 150 may be configured to store information indicating the relationship between the amount of solar light and the power capable of being generated (e.g., generable power) in the solar charging panel 110, and may be configured to store information regarding the power consumption consumed during the power generation.

The storage 150 may be implemented as at least one of a non-volatile memory device (for example, a cache, ROM, PROM, EPROM, EEPROM, and flash memory), a volatile memory device (for example, RAM), or a storage medium (for example, HDD and CD-ROM) to store various information, although not limited to these.

Furthermore, the display 160 may be disposed within the vehicle 1 to display the SOC of the high-voltage battery 120. Accordingly, a user of the vehicle 1 may identify the SOC of the high-voltage battery 120. The display 160 may be positioned in a cluster (not shown) within the vehicle 1, or may be positioned in an upper panel of a dashboard (not shown). However, the position where the display 160 is installed is not limited to the above-described example, and the display 160 may be in a position where the SOC of the high-voltage battery 120 may be provided to the user within the vehicle 1. In addition, the display 160 may include a panel, and the panel may be a cathode ray tube (CRT) panel, a liquid crystal display (LCD) panel, a light emitting diode (LED) panel, an organic light emitting diode (OLED) panel, a plasma display panel (PDP), or a field emission display (FED) panel.

The controller 170 may be configured to determine whether the starting of the vehicle 1 is off/on based on whether the key of the vehicle 1 is on/off. In other words, when a driver turns on an ignition, the starting of the vehicle is on and when the driver turns off the ignition, the starting of the vehicle is off. However, when a variable value of the vehicle 1 capable of being used to determine whether the starting of the vehicle 1 is on/off, it may be used without any limitation on whether the starting of the vehicle 1 is on/off. The controller 170 may then be configured to calculate the generable power through the solar charging panel 110 based on the amount of light measured through the solar charging panel 110 when the starting of the vehicle 1 is off. At this time, the controller 170 may be configured to calculate the generable power based on the information indicating the relationship between the amount of solar light stored in advance and the generable power that may be generated in the solar charging panel 110.

The calculated generable power may refer to the generable power per unit time through the solar charging panel 110. The controller 170 may be configured to compare the calculated generable power with the power consumption consumed during the power generation and operate the solar charging panel 110 to generate the power when the calculated generable power is greater than the power consumption. In particular, the power consumption consumed in the power generation may correspond to the basic power consumption per unit time consumed when the solar charging panel 110 generates the power and may include the power consumption under the operation of the controller 170 and the power consumption according to the measurement of the battery sensor 140. The power consumption consumed during the power generation may correspond to the power consumption consumed in generating the power through the solar charging panel 110.

The controller 170 may be configured to operate the solar charging panel 110 to supply the power generated from the solar charging panel 110 to the high-voltage battery 120 or the auxiliary battery 130 based on the SOC of the high-voltage battery 120 and the SOC of the auxiliary battery 130 when the starting of the vehicle 1 is off. This will be described in detail later. The controller 170 may include at least one memory configured to store a program for performing the above-described operations and the operations described below, and at least one processor that executes the stored program. When there are a plurality of memories and processors, they may be integrated on one chip, or they may be provided in physically separated positions.

The motor 180 may be configured to provide the rotational force to the front wheels 21 or the rear wheels 22 corresponding to the driving device 16. The electric field load 190 corresponds to the electrical component that performs various functions of the vehicle 1 and may include a lamp, an air conditioner, a black box device, a window adjusting device of the vehicle 1, or the like, and may be included in any electrical component capable of performing various functions of the vehicle 1 without limitation.

Figure 3:
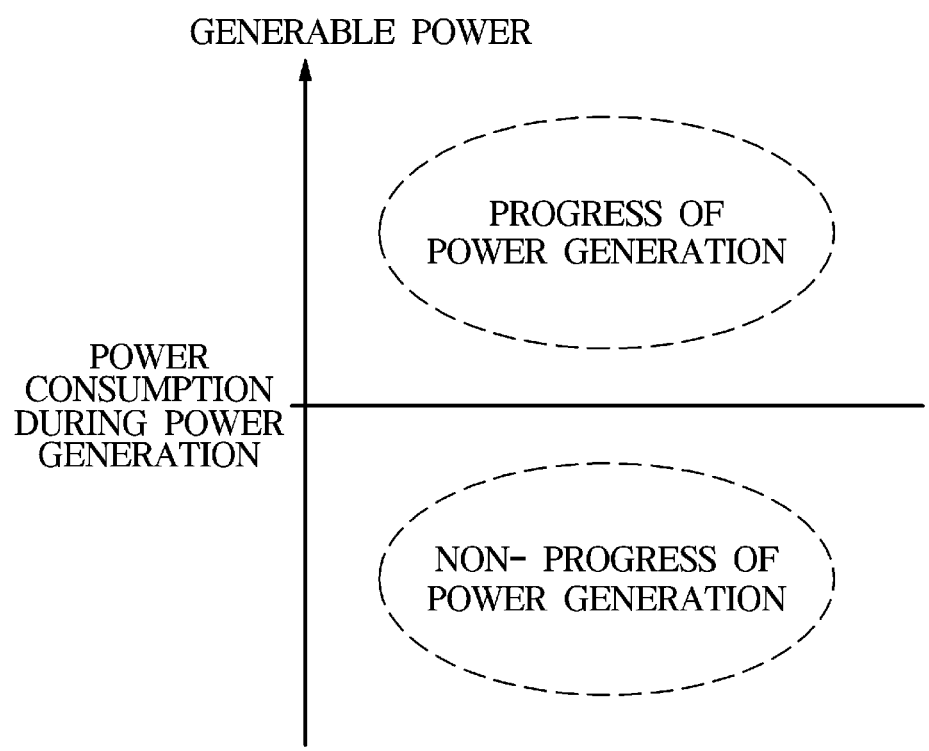
FIG. 3 is a view illustrating whether power is generated through a solar charging panel according to an exemplary embodiment of the present disclosure.

FIG. 3 is a view illustrating whether power is generated through a solar charging panel according to an exemplary embodiment. Referring to FIG. 3, the controller 170 may be configured to calculate the generable power through the solar charging panel 110 based on the amount of light measured through the solar charging panel 110 when the starting of the vehicle 1 is off. At this time, the controller 170 may be configured to calculate the generable power based on the information indicating the relationship between the amount of light stored in advance and the generable power capable of being generated in the solar charging panel 110. The calculated generable power may refer to the power capable of being generated per unit time through the solar charging panel 110. The controller 170 may be configured to compare the calculated generable power with the power consumption consumed during the power generation and control the solar charging panel 110 to generate the power when the calculated generable power is greater than the power consumption.

In other words, the controller 170 may be configured to operate the solar charging panel 110 to proceed with the power generation when the calculated generable power is greater than the power consumption during the power generation. The controller 170 may also be configured to prevent the solar charging panel 110 from performing the power generation when the calculated generable power is less than the power consumption during the power generation. In this case, the power consumption consumed in the power generation may correspond to the basic power consumption per unit time consumed when the solar charging panel 110 generates the power and may include the power consumption under the operation of the controller 170 and the power consumption according to the measurement of the battery sensor 140.

Thus, the vehicle 1 may be configured to determine whether to generate the power through the solar charging panel 110 in consideration of the amount of solar light capable of being varied depending on characteristics of space in which the vehicle 1 is parked, characteristics of weather, and characteristics of time. In other words, the vehicle 1 may generate the power through the solar charging panel 110 only when the generable power according to the amount of the present solar light is greater than the power consumption during the power generation so that the generable power is less than the power consumption during the power generation to prevent the discharge of the high-voltage battery 120 or the auxiliary battery 130.

Figure 4:
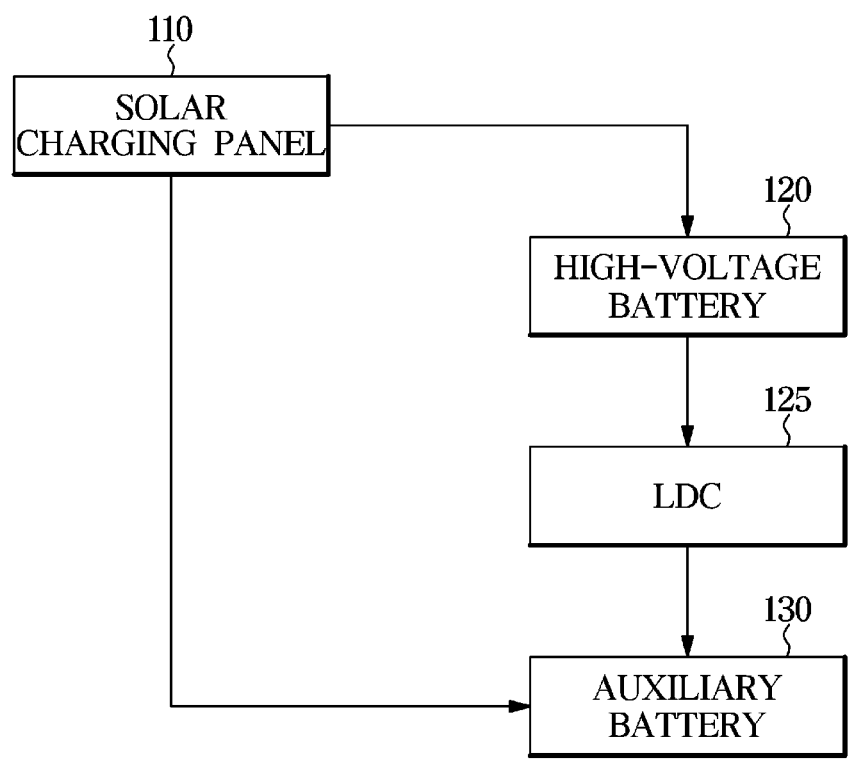
FIG. 4 is a view illustrating a power supply direction in the vehicle according to an exemplary embodiment of the present disclosure.

FIG. 4 is a view illustrating a power supply direction in the vehicle according to an exemplary embodiment. Referring to FIG. 4, the vehicle 1 may include the solar charging panel 110, the high-voltage battery 120, a low-voltage DC-DC converter (LDC) 125 and the auxiliary battery 130. As illustrated in FIG. 4, the power generated through the solar charging panel 110 may be supplied to the high-voltage battery 120 or the auxiliary battery 130 when the starting of the vehicle 1 is off.

When insufficient power is stored in the auxiliary battery 130, the power stored in the high-voltage battery 120 may be used to charge the auxiliary battery 130 through the LDC 125. Particularly, the LDC 125 may be configured to convert a high direct current (DC) voltage of the high-voltage battery 120 to a low DC voltage. The LDC 125 may also be configured to convert the high DC voltage (DC) of the high-voltage battery 120 into an alternating current (AC) voltage, less the AC through a coil, a transformer, or a capacitor, and the like, and then rectify the voltage to convert the DC to a reduced voltage. The reduced DC voltage may be supplied to the auxiliary battery 130 to charge the auxiliary battery 130.

In other words, when insufficient power is stored in the auxiliary battery 130, the power consumption from the power of the high-voltage battery 120 to the LDC 125 is increased during driving of the vehicle 1, and thus, the fuel efficiency of the vehicle 1 may be reduced. Therefore, the vehicle 1 may be configured to operate the solar charging panel 110 to supply the power generated from the solar charging panel 110 to the high-voltage battery 120 or the auxiliary battery 130 based on the SOC of the high-voltage battery 120 and the SOC of the auxiliary battery 130 in a state in which the starting of the vehicle 1 is off. In response to determining that the SOC of the auxiliary battery 130 is insufficient when the starting of the vehicle 1 is off, the vehicle 1 may improve the fuel efficiency by operating the solar charging panel 110 to supply the power generated from the solar charging panel 110 to the auxiliary battery 130.

Hereinafter, an algorithm for supplying the power generated from the solar charging panel 110 to the high-voltage battery 120 or the auxiliary battery 130 will be described in detail. FIG. 5 is a view illustrating battery charging priority in the vehicle according to an exemplary embodiment.

Referring to FIG. 5, the controller 170 may be configured to determine the battery to be supplied with the power generated from the solar charging panel 110 based on the SOC of each of the high-voltage battery 120 and the auxiliary battery 130 measured from the battery sensor 140 when the starting of the vehicle 1 is off. Particularly, in response to determining that the SOC of the auxiliary battery 130 is less than the reference SOC of the predetermined auxiliary battery 130, the controller 170 may be configured to operate the solar charging panel 110 to supply the power generated from the solar charging panel 110 to the auxiliary battery 130.

In addition, in response to determining that the SOC of the auxiliary battery 130 is equal to or greater than the reference SOC of the predetermined auxiliary battery 130 and the SOC of the high-voltage battery 120 is equal to or greater than the reference SOC of the predetermined high-voltage battery 120, the controller 170 may be configured to operate the solar charging panel 110 to supply the power generated from the solar charging panel 110 to the auxiliary battery 130. In response to determining that the SOC of the auxiliary battery 130 is equal to or greater than the reference SOC of the predetermined auxiliary battery 130 and the SOC of the high-voltage battery 120 is less than the reference SOC of the predetermined high-voltage battery 120, the controller 170 may be configured to operate the solar charging panel 110 to supply the power generated from the solar charging panel 110 to the high-voltage battery 120.

Figure 6:
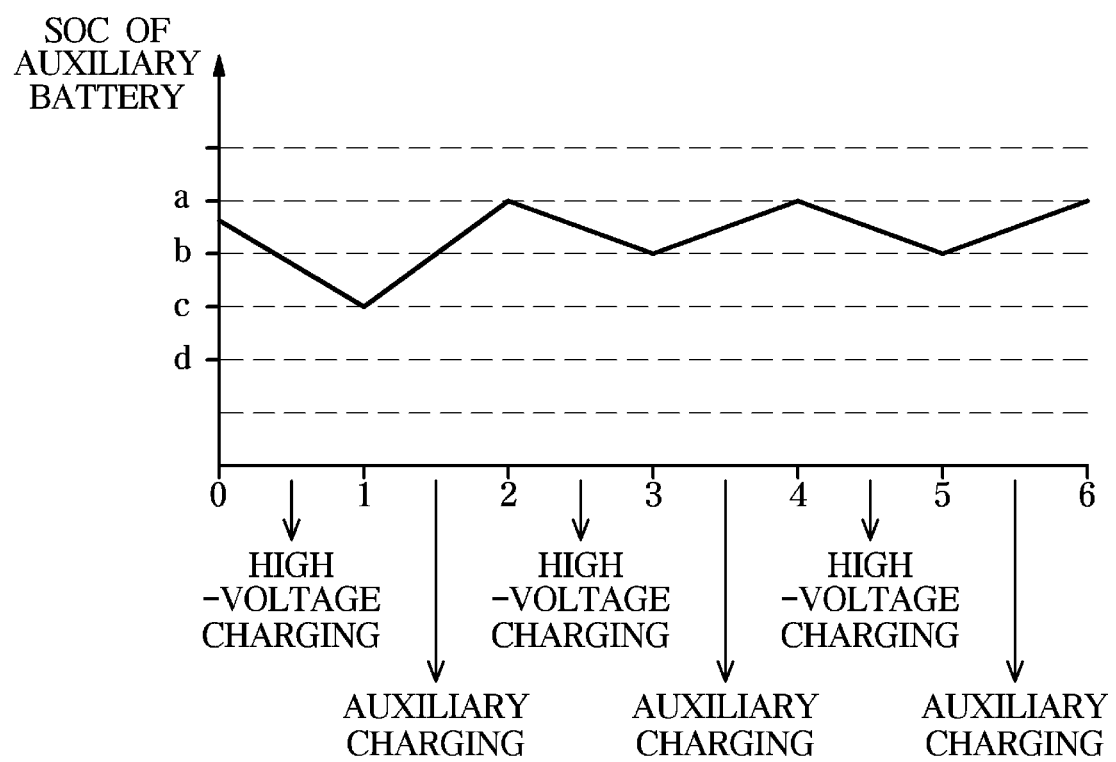
FIGS. 6 and 7 are views illustrating a case where a state of charge (SOC) of a high-voltage battery is equal to or greater than a reference SOC and the SOC of an auxiliary battery is equal to or greater than the reference SOC according to an exemplary embodiment of the present disclosure.
Figure 7:
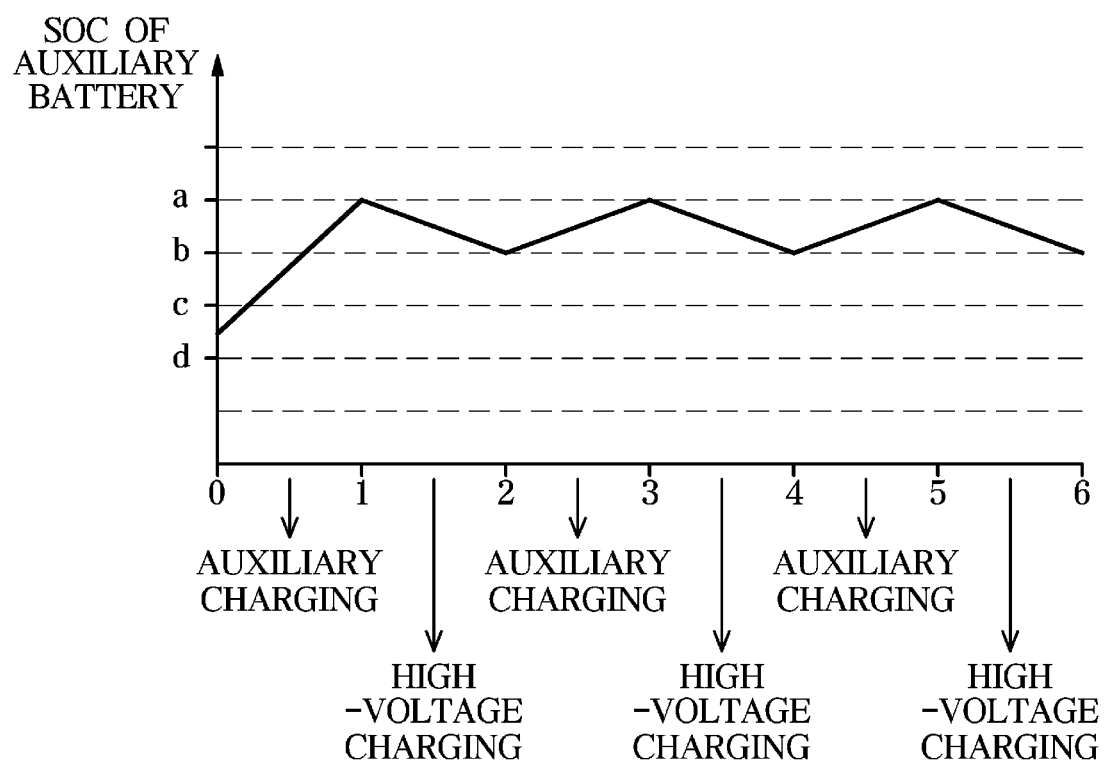

Hereinafter, the supply of the power generated from the solar charging panel 110 to the high-voltage battery 120 or the auxiliary battery 130 according to the SOC of each of the high-voltage battery 120 and the auxiliary battery 130 will be described in detail. FIGS. 6 and 7 are views illustrating a case where a state of charge (SOC) of a high-voltage battery is equal to or greater than a reference SOC and the SOC of an auxiliary battery is equal to or greater than the reference SOC according to an exemplary embodiment. Hereinafter, the predetermined reference SOC of the high-voltage battery 120 is referred to as a first reference SOC and the predetermined reference SOC of the auxiliary battery 130 is referred to as a second reference SOC.

When the SOC of the high-voltage battery 120 is equal to or greater than the predetermined first reference SOC and the SOC of the auxiliary battery 130 is equal to or greater than the predetermined second reference SOC (d) when the starting of the vehicle 1 is off, the controller 170 may be configured to operate the solar charging panel 110 to supply the power generated from the solar charging panel 110 to the auxiliary battery 130. The auxiliary battery 130 may be discharged due to the power supply to the electric field load 190 that performs a part of the function of the vehicle 1 even when the starting of the vehicle 1 is off. For example, the auxiliary battery 130 may be configured to supply the power to the black box device and an anti-theft sensor of the vehicle 1.

At this time, when the SOC of the auxiliary battery 130 of the vehicle 1 is low, the power of the high-voltage battery 120 may be consumed and the auxiliary battery 130 may be charged. Accordingly, the controller 170 may be configured to operate the solar charging panel 110 to supply the power to the auxiliary battery 130 when the SOC of both the high-voltage battery 120 and the auxiliary battery 130 is equal to or greater than the respective reference SOC. However, the controller 170 may be configured to operate the solar charging panel 110 to supply the power to the high-voltage battery 120 even when the SOC of both the high-voltage battery 120 and the auxiliary battery 130 is equal to or greater than the respective reference SOC.

Referring to FIG. 6, when the SOC of the auxiliary battery 130 is equal to or less than the maximum SOC (a) and is equal to or greater than a predetermined normal control lower limit SOC (b) even when the SOC of the high-voltage battery 120 is equal to or greater than the predetermined first reference SOC and the SOC of the auxiliary battery 130 is equal to or greater than the predetermined second reference SOC (d) when the starting of the vehicle 1 is off, the controller 170 may be configured to operate the solar charging panel 110 to supply the power generated from the solar charging panel 110 to the high-voltage battery 120 until the auxiliary battery 130 is discharged and the SOC of the auxiliary battery 130 reaches a predetermined first threshold SOC (c).

When the auxiliary battery 130 is discharged and the SOC of the auxiliary battery 130 reaches the predetermined first threshold SOC (c), the controller 170 may also be configured to operate the solar charging panel 110 to supply the power generated from the solar charging panel 110 to the auxiliary battery 130. When the auxiliary battery 130 is charged and the SOC of the auxiliary battery 130 reaches the maximum SOC (a), the controller 170 may be configured to operate the solar charging panel 110 to supply the power generated from the solar charging panel 110 to the high-voltage battery 120. When the auxiliary battery 130 is discharged again and the SOC of the auxiliary battery 130 reaches the predetermined normal control lower limit SOC (b), the controller 170 may be configured to operate the solar charging panel 110 to supply the power generated from the solar charging panel 110 to the auxiliary battery 130.

Particularly, the maximum SOC (a) may indicate the SOC when the auxiliary battery 130 is fully charged, and the normal control lower limit SOC (b) may represent the lower limit SOC at the steady state for supplying the optimum power to the electric field load 190, and has a value equal to or greater than the reference SOC (d). The first threshold SOC (c) may represent the SOC at a specific point that is equal to or less than the normal control lower limit SOC (b) and equal to or greater than the reference SOC (d) and represent the SOC when the auxiliary battery 130 is discharged for a particular time after the starting of the vehicle 1 is off. The first threshold SOC may be preset during the design stage and stored in the storage 150.

The supplying of the power generated preferentially to the high-voltage battery 120 until the SOC of the auxiliary battery 130 reaches the first threshold SOC (c) may charge the high-voltage battery 120 that allows the user of the vehicle 1 to identify or view the SOC through the display 160 to provide the solar charging panel 110 to indicate that power charging is being performed. Alternatively, when the SOC of the auxiliary battery 130 is less than the predetermined normal control lower limit SOC (b) and equal to or greater than the second reference SOC (d), the controller 170 may be configured to operate the solar charging panel 110 to supply the power generated from the solar charging panel 110 to the auxiliary battery 130.

When the SOC of the auxiliary battery 130 is less than the normal control lower limit SOC (b), the high-voltage battery 120 may be configured to charge the auxiliary battery 130 and the fuel consumption may be reduced, and thus, the power supply to the auxiliary battery 130 may be prioritized. When the auxiliary battery 130 is charged and the SOC of the auxiliary battery 130 reaches the maximum SOC (a), the controller 170 may be configured to operate the solar charging panel 110 to supply the power generated from the solar charging panel 110 to the high-voltage battery 120.

When the auxiliary battery 130 is discharged again and the SOC of the auxiliary battery 130 reaches the predetermined normal control lower limit SOC (b), the controller 170 may be configured to operate the solar charging panel 110 to supply the power generated from the solar charging panel 110 to the auxiliary battery 130. The power generated from the solar charging panel 110 may be supplied to the high-voltage battery 120 or the auxiliary battery 130 to charge the batteries 120 and 130 while the starting of the vehicle 1 is off. In other words, the charging of the batteries 120 and 130 may be continued until the starting of the vehicle 1 is turned on.

Figure 8:
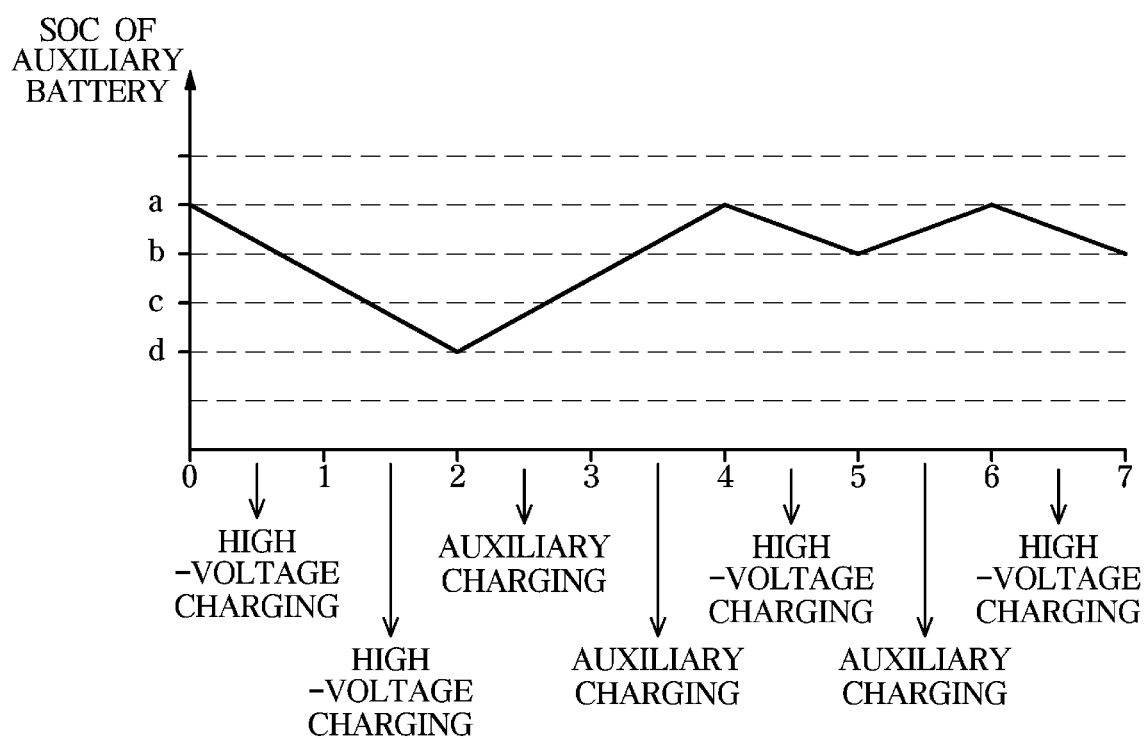
FIGS. 8 and 9 are views illustrating a case where the SOC of the high-voltage battery is less than the SOC and the SOC of the auxiliary battery is equal to or greater than the reference SOC according to an exemplary embodiment of the present disclosure.
Figure 9:
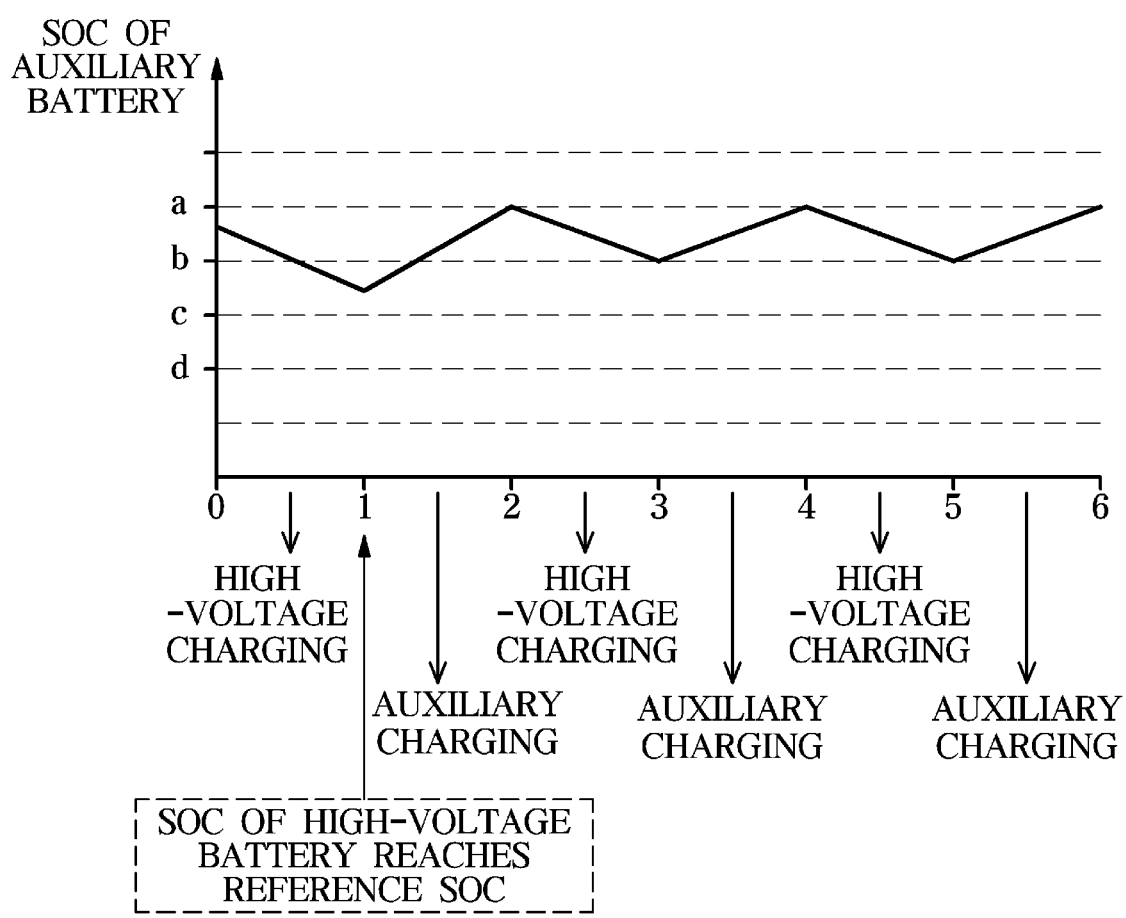

FIGS. 8 and 9 are views illustrating a case where the SOC of the high-voltage battery is less than the SOC and the SOC of the auxiliary battery is equal to or greater than the reference SOC according to an exemplary embodiment. When the SOC of the high-voltage battery 120 is less than the predetermined first reference SOC and the SOC of the auxiliary battery 130 is equal to or greater than the predetermined second reference SOC (d) when the starting of the vehicle 1 is off, the controller 170 may be configured to operate the solar charging panel 110 to supply the power generated from the solar charging panel 110 to the high-voltage battery 120.

When the SOC of the high-voltage battery 120 falls below the first reference SOC, the vehicle 1 may use the electrical energy generated by the motor regeneration based on the margin output of the engine of the vehicle 1 to charge the high-voltage battery 120. In other words, when the SOC of the high-voltage battery 120 falls below the first reference SOC, an idle charge that corresponds to the charging of the high-voltage battery 120 using the engine during driving of the vehicle 1 may be performed and thus, the engine is always turned on even during the stop of the vehicle 1, and thus, the fuel efficiency may be deteriorated.

Accordingly, when the SOC of the high-voltage battery 120 is less than the predetermined first reference SOC and the SOC of the auxiliary battery 130 is equal to or greater than the predetermined second reference SOC (d), the controller 170 may be configured to operate the solar charging panel 110 to supply the power generated from the solar charging panel 110 to the high-voltage battery 120. Particularly, referring to FIG. 8, the controller 170 may be configured to operate the solar charging panel 110 to supply the power generated from the solar charging panel 110 to the high-voltage battery 120 when the starting of the vehicle 1 is off.

At this time, when the auxiliary battery 130 is discharged and the SOC of the auxiliary battery 130 reaches the second reference SOC (d), the controller 170 may be configured to operate the solar charging panel 110 to supply the power generated from the solar charging panel 110 to the auxiliary battery 130. Accordingly, the SOC of the auxiliary battery 130 may be prevented from falling below the second reference SOC (d) and the measurement of the remaining SOC of the auxiliary battery 130 may be prevented from being inaccurate, thus protecting the auxiliary battery 130.

Even when the solar charging panel 110 is operated to supply the power generated from the solar charging panel 110 to the high-voltage battery 120, when the auxiliary battery 130 is discharged and the SOC of the auxiliary battery 130 reaches the second reference SOC (d), the controller 170 may be configured to operate the solar charging panel 110 to supply the power generated from the solar charging panel 110 to the auxiliary battery 130.

When the auxiliary battery 130 is charged and the SOC of the auxiliary battery 130 reaches the maximum SOC (a), the controller 170 may be configured to operate the solar charging panel 110 to supply the power generated from the solar charging panel 110 to the high-voltage battery 120. When the auxiliary battery 130 is discharged again and the SOC of the auxiliary battery 130 reaches the predetermined normal control lower limit SOC (b), the controller 170 may be configured to operate the solar charging panel 110 to supply the power generated from the solar charging panel 110 to the auxiliary battery 130.

Referring to FIG. 9, the controller 170 may be configured to operate the solar charging panel 110 to supply the power generated from the solar charging panel 110 to the auxiliary battery 130 when the high-voltage battery 120 is charged as the power generated from the solar charging panel 110 is supplied to the high-voltage battery 120 and the SOC of the high-voltage battery 120 reaches the first reference SOC. In other words, even when the solar charging panel 110 is operated to supply the power generated from the solar charging panel 110 to the high-voltage battery 120, when the high-voltage battery 120 is charged and the SOC of the high-voltage battery 120 reaches the first reference SOC, the controller 170 may be configured to operate the solar charging panel 110 to supply the power generated from the solar charging panel 110 to the auxiliary battery 130.

When the auxiliary battery 130 is charged and the SOC of the auxiliary battery 130 reaches the maximum SOC (a), the controller 170 may be configured to operate the solar charging panel 110 to supply the power generated from the solar charging panel 110 to the high-voltage battery 120. When the auxiliary battery 130 is discharged again and the SOC of the auxiliary battery 130 reaches the predetermined normal control lower limit SOC (b), the controller 170 may be configured to operate the solar charging panel 110 to supply the power generated from the solar charging panel 110 to the auxiliary battery 130. The power generated from the solar charging panel 110 may be supplied to the high-voltage battery 120 or the auxiliary battery 130 to charge the batteries 120 and 130 while the starting of the vehicle 1 is off. In other words, the charging of the batteries 120 and 130 may be continued until the starting of the vehicle 1 is on.

Figure 10:
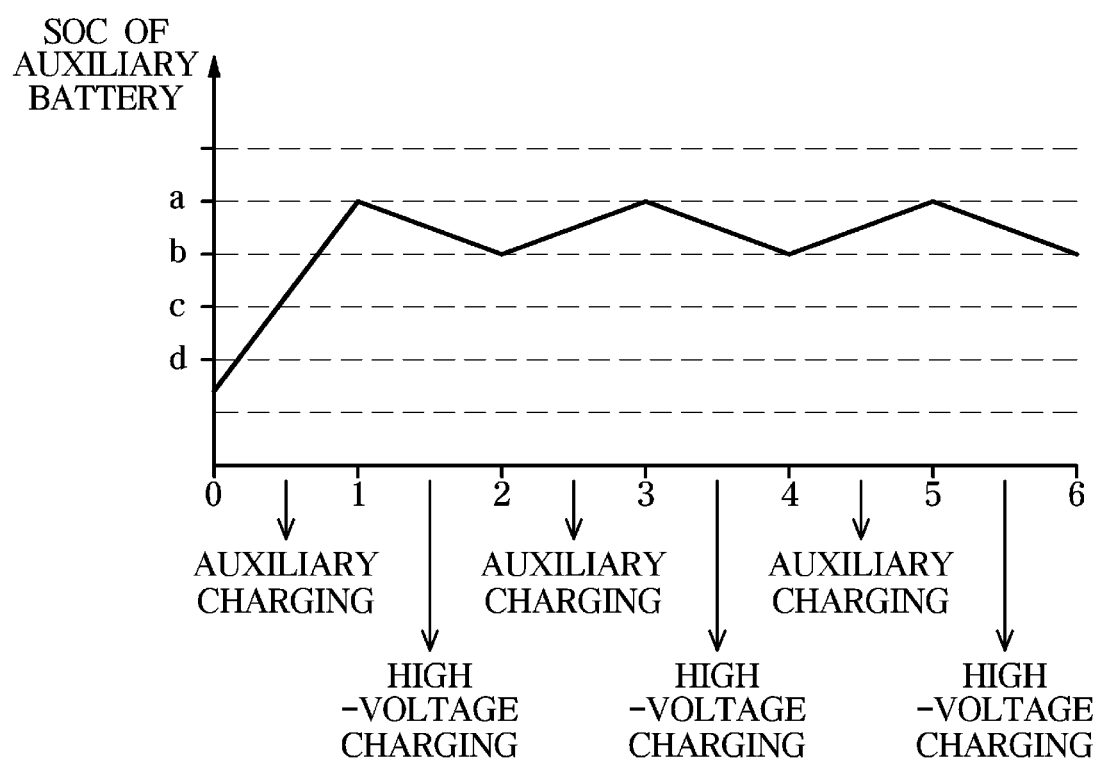
FIG. 10 is a view illustrating a case where the SOC of the high-voltage battery is equal to or greater than the SOC and the SOC of the auxiliary battery is less than the reference SOC according to an exemplary of the present disclosure.

FIG. 10 is a view illustrating a case where the SOC of the high-voltage battery is equal to or greater than the SOC and the SOC of the auxiliary battery is less than the reference SOC according to an exemplary embodiment. Referring to FIG. 10, when the SOC of the high-voltage battery 120 is equal to or greater than the predetermined first reference SOC and the SOC of the auxiliary battery 130 is less than the predetermined second reference SOC (d) when the starting of the vehicle 1 is off, the controller 170 may be configured to operate the solar charging panel 110 to supply the power generated from the solar charging panel 110 to the auxiliary battery 130.

When the auxiliary battery 130 is charged and the SOC of the auxiliary battery 130 reaches the maximum SOC (a), the controller 170 may be configured to operate the solar charging panel 110 to supply the power generated from the solar charging panel 110 to the high-voltage battery 120. When the auxiliary battery 130 is discharged again and the SOC of the auxiliary battery 130 reaches the predetermined normal control lower limit SOC (b), the controller 170 may be configured to operate the solar charging panel 110 to supply the power generated from the solar charging panel 110 to the auxiliary battery 130. The power generated from the solar charging panel 110 may be supplied to the high-voltage battery 120 or the auxiliary battery 130 to charge the batteries 120 and 130 while the starting of the vehicle 1 is off. In other words, the charging of the batteries 120 and 130 may be continued until the starting of the vehicle 1 is on.

Figure 11:
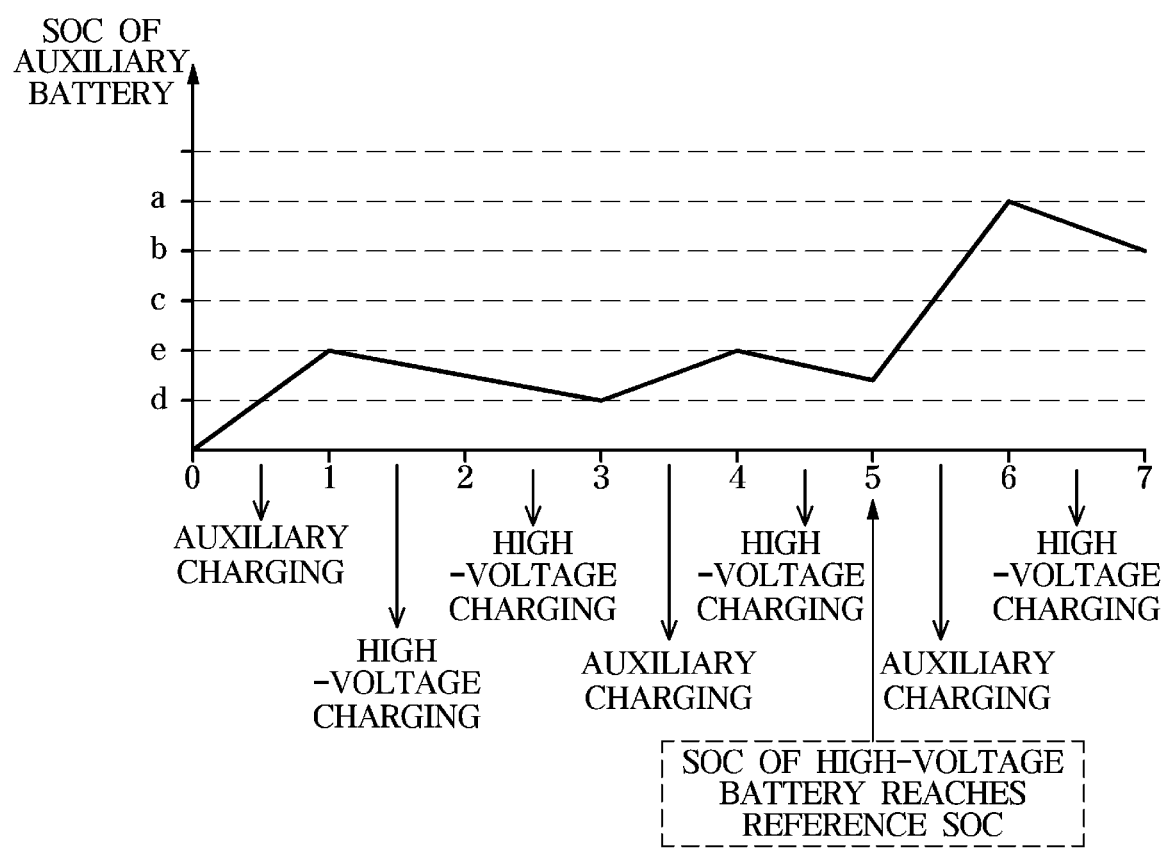
FIG. 11 is a view illustrating a case where the SOC of the high-voltage battery is less than the SOC and the SOC of the auxiliary battery is less than the reference SOC according to an exemplary embodiment of the present disclosure.

FIG. 11 is a view illustrating a case where the SOC of the high-voltage battery is less than the SOC and the SOC of the auxiliary battery is less than the reference SOC according to an exemplary embodiment. Referring to FIG. 11, when the SOC of the high-voltage battery 120 is less than the predetermined first reference SOC and the SOC of the auxiliary battery 130 is less than the predetermined second reference SOC (d) when the starting of the vehicle 1 is off, the controller 170 may be configured to operate the solar charging panel 110 to supply the power generated from the solar charging panel 110 to the auxiliary battery 130.

Additionally, when the auxiliary battery 130 is charged and the SOC of the auxiliary battery 130 reaches the predetermined second threshold SOC (e), the controller 170 may be configured to operate the solar charging panel 110 to supply the power generated from the solar charging panel 110 to the high-voltage battery 120. The second threshold SOC (e) is a value preset during the design stage and stored in the storage 150, and may correspond to the SOC at a specific point that is equal to or greater than the second reference SOC (d) and equal to or less than the normal control lower limit SOC (b).

Particularly, the controller 170 may be configured to operate the solar charging panel 110 to supply the power generated from the solar charging panel 110 to the high-voltage battery 120 when the auxiliary battery 130 is charged to a particular level (e.g., the second threshold SOC (e)) even when the SOC of the high-voltage battery 120 is less than the predetermined first reference SOC and the SOC of the auxiliary battery 130 is less than the predetermined second reference SOC (d). In other words, when the SOC of the high-voltage battery 120 falls below the first reference SOC, an idle charge corresponding to the charging of the high-voltage battery 120 using the engine during driving of the vehicle 1 may be performed and thus, the engine is always turned on even during the stop of the vehicle 1 causing the fuel efficiency to be deteriorated.

When the auxiliary battery 130 is discharged and the SOC of the auxiliary battery 130 reaches the second reference SOC (d), the controller 170 may be configured to operate the solar charging panel 110 to supply the power generated from the solar charging panel 110 to the auxiliary battery 130. As described above, as the auxiliary battery 130 may be charged and discharged and the SOC of the auxiliary battery 130 reciprocates between the second reference SOC (d) and the second threshold SOC (e), the high-voltage battery 120 may be charged and the SOC of the high-voltage battery 120 may reach the first reference SOC.

Further, the controller 170 may be configured to operate the solar charging panel 110 to supply the power generated from the solar charging panel 110 to the auxiliary battery 130 when the high-voltage battery 120 is charged and the SOC of the high-voltage battery 120 reaches the first reference SOC. When the auxiliary battery 130 is charged and the SOC of the auxiliary battery 130 reaches the maximum SOC (a), the controller 170 may be configured to operate the solar charging panel 110 to supply the power generated from the solar charging panel 110 to the high-voltage battery 120. When the auxiliary battery 130 is discharged again and the SOC of the auxiliary battery 130 reaches the predetermined normal control lower limit SOC (b), the controller 170 may be configured to operate the solar charging panel 110 to supply the power generated from the solar charging panel 110 to the auxiliary battery 130.

The power generated from the solar charging panel 110 may be supplied to the high-voltage battery 120 or the auxiliary battery 130 to charge the batteries 120 and 130 while the starting of the vehicle 1 is off. The charging of the batteries 120 and 130 may be continued until the starting of the vehicle 1 is turned on. When the auxiliary battery 130 is charged and the SOC of the auxiliary battery 130 reaches the maximum SOC (a), the controller 170 may be configured to operate the solar charging panel 110 to supply the power generated from the solar charging panel 110 to the high-voltage battery 120. When the high-voltage battery 120 is charged and the SOC of the high-voltage battery 120 reaches the maximum SOC, the controller 170 may be configured to operate the solar charging panel 110 to supply the power generated from the solar charging panel 110 to the auxiliary battery 130.

In addition, the vehicle 1 may further include a separate battery (not shown) configured to store the power generated from the solar charging panel 110. The controller 170 may be configured to operate the separate battery to supply the power stored in the battery based on the SOC of the high-voltage battery 120 and the SOC of the auxiliary battery 130 when the starting of the vehicle 1 is off, (not shown) to the high-voltage battery 120 or the auxiliary battery 130, respectively.

Hereinafter, a method for controlling the vehicle 1 according to the exemplary embodiment will be described. The method described herein below may be executed by a controller. The vehicle 1 according to the above-described exemplary embodiment may be applied to the method for controlling the vehicle 1 described later. Therefore, the contents described above with reference to FIGS. 1 to 11 are equally applicable to the method for controlling the vehicle 1 according to the exemplary embodiment, without any particular mention.

Figure 12:
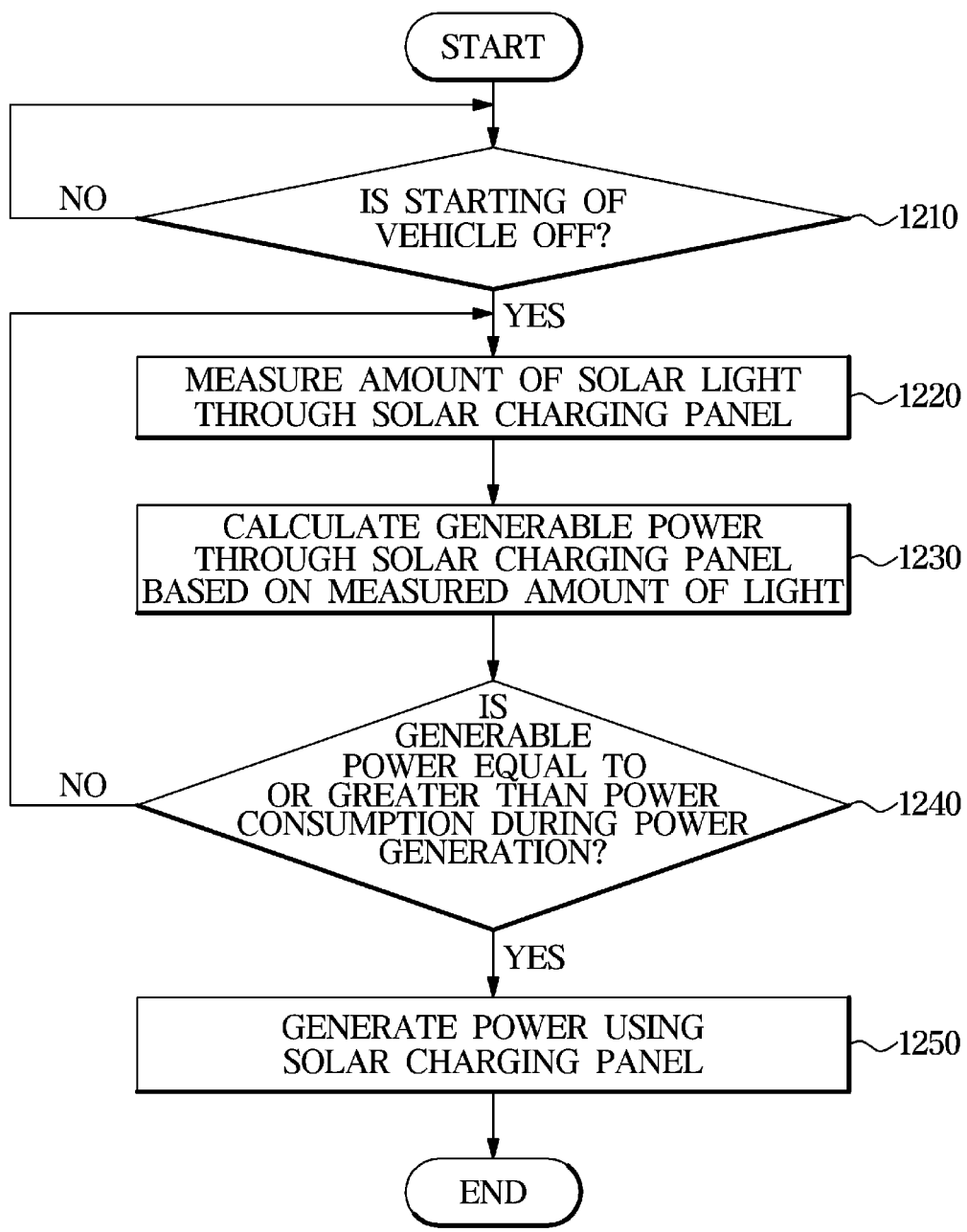
FIG. 12 is a flowchart illustrating a method for controlling the vehicle according to an exemplary embodiment of the present disclosure, in the case of determining whether to generate the power through the solar charging panel.

FIG. 12 is a flowchart illustrating a method for controlling the vehicle according to an exemplary embodiment, in the case of determining whether to generate the power through the solar charging panel. Referring to FIG. 12, the vehicle 1 may be configured to measure the amount of solar light through the solar charging panel 110 when the starting of the vehicle 1 is off (YES in 1210) (1220).

Particularly, the controller 170 of the vehicle 1 may be configured to calculate the generable power through the solar charging panel 110 based on the measured amount of light (1230). The controller 170 may be configured to calculate the generable power based on the information indicating the relationship between the amount of solar light stored in advance and the generable power capable of being generated in the solar charging panel 110. The calculated generable power may refer to the power capable of being generated per unit time through the solar charging panel 110.

The vehicle 1 may be configured to generate the power using the solar charging panel 110 (1250) when the calculated generable power is equal to or greater than the power consumption during the power generation (YES in 1240). Particularly, the controller 170 of the vehicle 1 may be configured to compare the calculated generable power with the power consumption during the stored power generation, and operate the solar charging panel 110 to generate the power when the calculated generable power is greater than the power consumption during the power generation.

In other words, the controller 170 may be configured to operate the solar charging panel 110 to proceed with the power generation when the calculated generable power is greater than the power consumption during the power generation. The controller 170 may also be configured to prevent the solar charging panel 110 from preforming the power generation when the calculated generable power is less than the power consumption during the power generation. In this case, the power consumption consumed in the power generation may correspond to the basic power consumption per unit time consumed when the solar charging panel 110 generates the power and may include the power consumption under the operation of the controller 170 and the power consumption according to the measurement of the battery sensor 140.

Figure 13:
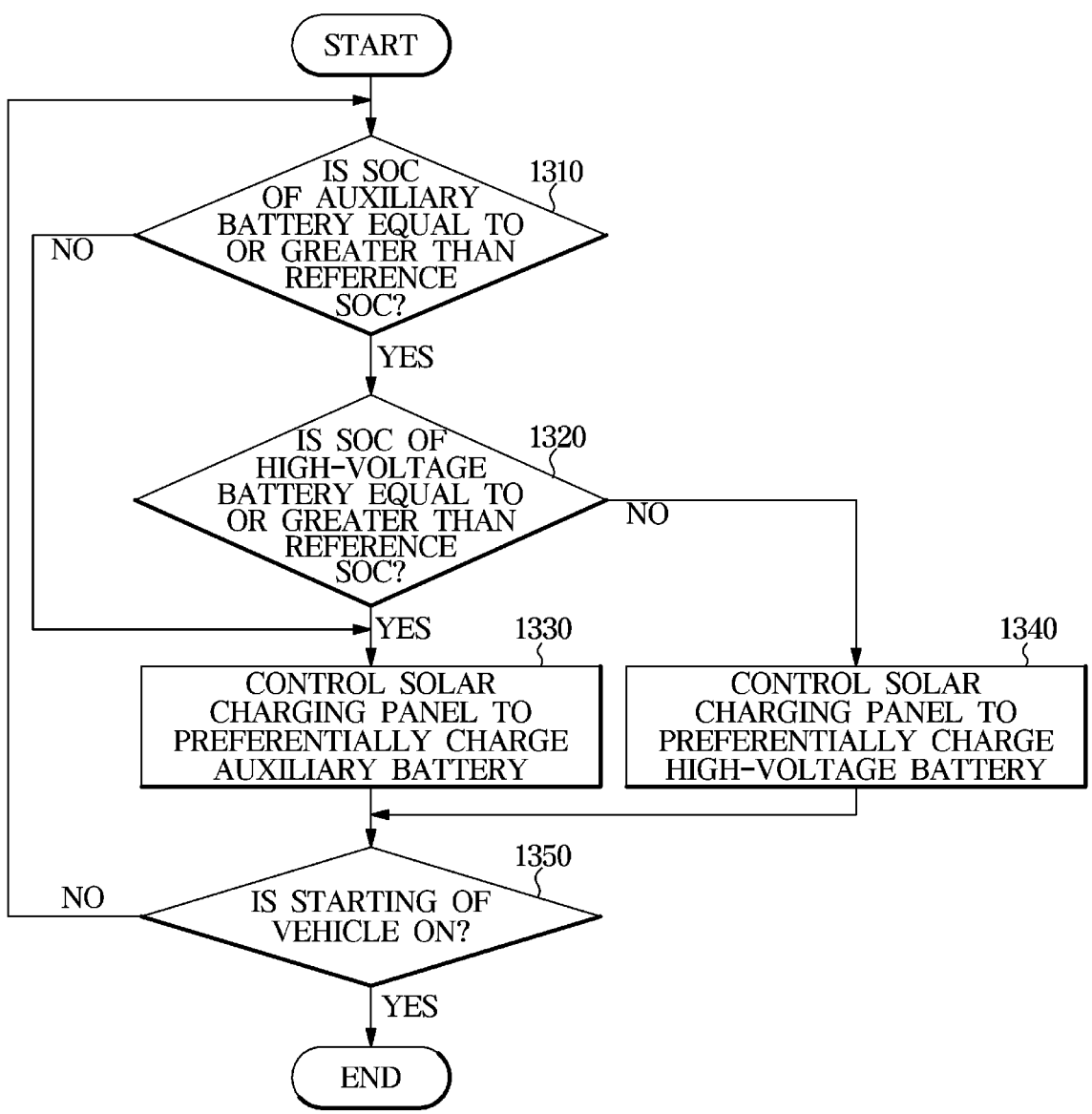
FIG. 13 is a flowchart of a method for controlling the vehicle according to an exemplary embodiment of the present disclosure, in the case of charging a battery through the solar charging panel.

FIG. 13 is a flowchart of a method for controlling the vehicle according to an exemplary embodiment, when charging a battery through the solar charging panel. The method described herein below may be executed by the controller. Referring to FIG. 13, the controller 170 may be configured to determine that the battery is supplied with the power generated from the solar charging panel 110 based on the SOC of each of the high-voltage battery 120 and the auxiliary battery 130 measured from the battery sensor 140 when the starting of the vehicle 1 is off.

Particularly, when the SOC of the auxiliary battery 130 is equal to or greater than the reference SOC (YES in 1310) and the SOC of the high-voltage battery 120 is equal to or greater than the reference SOC (YES in 1320), the controller 170 may be configured to operate the solar charging panel 110 to charge the auxiliary battery 130 (1330). In other words, the controller 170 may be configured to operate the solar charging panel 110 to preferentially supply power to the auxiliary battery 130 when the SOC of both the high-voltage battery 120 and the auxiliary battery 130 is equal to or greater than the respective reference SOC.

However, the controller 170 may be configured to operate the solar charging panel 110 to preferentially supply power to the high-voltage battery 120 even when the SOC of both the high-voltage battery 120 and the auxiliary battery 130 is equal to or greater than the respective reference SOC. When the SOC of the auxiliary battery 130 is equal to or less than the maximum SOC (a) and is equal to or greater than a predetermined normal control lower limit SOC (b) even when the SOC of the high-voltage battery 120 is equal to or greater than the predetermined first reference SOC and the SOC of the auxiliary battery 130 is equal to or greater than the predetermined second reference SOC (d) when the starting of the vehicle 1 is off, the controller 170 may be configured to operate the solar charging panel 110 to supply the power generated from the solar charging panel 110 to the high-voltage battery 120 until the auxiliary battery 130 is discharged and the SOC of the auxiliary battery 130 reaches a predetermined first threshold SOC (c).

When the auxiliary battery 130 is discharged and the SOC of the auxiliary battery 130 reaches the predetermined first threshold SOC (c), the controller 170 may also be configured to operate the solar charging panel 110 to supply the power generated from the solar charging panel 110 to the auxiliary battery 130. Alternatively, when the SOC of the auxiliary battery 130 is less than the predetermined normal control lower limit SOC (b) and equal to or greater than the second reference SOC (d), the controller 170 may be configured to operate the solar charging panel 110 to supply the power generated from the solar charging panel 110 to the auxiliary battery 130.

When the auxiliary battery 130 is charged and the SOC of the auxiliary battery 130 reaches the maximum SOC (a), the controller 170 may be configured to operate the solar charging panel 110 to supply the power generated from the solar charging panel 110 to the high-voltage battery 120. When the auxiliary battery 130 is discharged again and the SOC of the auxiliary battery 130 reaches the predetermined normal control lower limit SOC (b), the controller 170 may be configured to operate the solar charging panel 110 to supply the power generated from the solar charging panel 110 to the auxiliary battery 130.

The power generated from the solar charging panel 110 may be supplied to the high-voltage battery 120 or the auxiliary battery 130 to charge the batteries 120 and 130 while the starting of the vehicle 1 is off. The charging of the batteries 120 and 130 may be continued until the starting of the vehicle 1 is on (YES in 1350). When the SOC of the auxiliary battery 130 is equal to or greater than the reference SOC (YES in 1310) when the starting of the vehicle 1 is off and the SOC of the high-voltage battery 120 is less than the reference SOC (NO in 1320), the controller 170 may also be configured to operate the solar charging panel 110 to charge the high-voltage battery 120 (1340).

In other words, when the SOC of the high-voltage battery 120 is less than the predetermined first reference SOC and the SOC of the auxiliary battery 130 is equal to or greater than the predetermined second reference SOC (d), the controller 170 may be configured to operate the solar charging panel 110 to supply the power generated from the solar charging panel 110 to the high-voltage battery 120. When the auxiliary battery 130 is discharged and the SOC of the auxiliary battery 130 reaches the second reference SOC (d), the controller 170 may be configured to operate the solar charging panel 110 to supply the power generated from the solar charging panel 110 to the auxiliary battery 130.

Even when the solar charging panel 110 is operated to supply the power generated from the solar charging panel 110 to the high-voltage battery 120, when the auxiliary battery 130 is discharged and the SOC of the auxiliary battery 130 reaches the second reference SOC (d), the controller 170 may be configured to operate the solar charging panel 110 to supply the power generated from the solar charging panel 110 to the auxiliary battery 130. The controller 170 may also be configured to operate the solar charging panel 110 to supply the power generated from the solar charging panel 110 to the auxiliary battery 130 when the high-voltage battery 120 is charged as the power generated from the solar charging panel 110 is supplied to the high-voltage battery 120 and the SOC of the high-voltage battery 120 reaches the first reference SOC.

Additionally, even when the solar charging panel 110 is operated to supply the power generated from the solar charging panel 110 to the high-voltage battery 120, when the high-voltage battery 120 is charged and the SOC of the high-voltage battery 120 reaches the first reference SOC, the controller 170 may be configured to operate the solar charging panel 110 to supply the power generated from the solar charging panel 110 to the auxiliary battery 130. When the auxiliary battery 130 is charged and the SOC of the auxiliary battery 130 reaches the maximum SOC (a), the controller 170 may be configured to operate the solar charging panel 110 to supply the power generated from the solar charging panel 110 to the high-voltage battery 120. When the auxiliary battery 130 is discharged again and the SOC of the auxiliary battery 130 reaches the predetermined normal control lower limit SOC (b), the controller 170 may be configured to operate the solar charging panel 110 to supply the power generated from the solar charging panel 110 to the auxiliary battery 130.

The power generated from the solar charging panel 110 may be supplied to the high-voltage battery 120 or the auxiliary battery 130 to charge the batteries 120 and 130 while the starting of the vehicle 1 is off. The charging of the batteries 120 and 130 may be completed when the starting of the vehicle 1 is on (YES in 1350). When the SOC of the auxiliary battery 130 is less than the reference SOC (NO in 1310) when the starting of the vehicle 1 is off, the controller 170 may also be configured to operate the solar charging panel 110 to charge the auxiliary battery 130 (1330).

Particularly, when the SOC of the high-voltage battery 120 is equal to or greater than the first reference SOC and the SOC of the auxiliary battery 130 is less than the second reference SOC (d) when the starting of the vehicle 1 is off, the controller 170 may be configured to operate the solar charging panel 110 to supply the power generated from the solar charging panel 110 to the auxiliary battery 130. When the auxiliary battery 130 is charged and the SOC of the auxiliary battery 130 reaches the maximum SOC (a), the controller 170 may be configured to operate the solar charging panel 110 to supply the power generated from the solar charging panel 110 to the high-voltage battery 120. Additionally, when the auxiliary battery 130 is discharged again and the SOC of the auxiliary battery 130 reaches the predetermined normal control lower limit SOC (b), the controller 170 may be configured to operate the solar charging panel 110 to supply the power generated from the solar charging panel 110 to the auxiliary battery 130.

The power generated from the solar charging panel 110 may be supplied to the high-voltage battery 120 or the auxiliary battery 130 to charge the batteries 120 and 130 while the starting of the vehicle 1 is off. The charging of the batteries 120 and 130 may be continued until the starting of the vehicle 1 is on (YES in 1350). When the SOC of the auxiliary battery 130 is less than the first reference SOC when the starting of the vehicle 1 is off and the SOC of the high-voltage battery 120 is less than the second reference SOC, the controller 170 may be configured to operate the solar charging panel 110 to supply the power generated from the solar charging panel 110 to the auxiliary battery 130.

When the auxiliary battery 130 is charged and the SOC of the auxiliary battery 130 reaches the predetermined second threshold SOC (e), the controller 170 may be configured to operate the solar charging panel 110 to supply the power generated from the solar charging panel 110 to the high-voltage battery 120. The second threshold SOC (e) is a value preset during the design stage and stored in the storage 150, and may correspond to the SOC at the specific point that is equal to or greater than the second reference SOC (d) and equal to or less than the normal control lower limit SOC (b).

The controller 170 may be configured to operate the solar charging panel 110 to supply the power generated from the solar charging panel 110 to the high-voltage battery 120 when the auxiliary battery 130 is charged to a particular level (e.g., the second threshold SOC (e)) even in a state where the SOC of the high-voltage battery 120 is less than the predetermined first reference SOC and the SOC of the auxiliary battery 130 is less than the predetermined second reference SOC (d). When the auxiliary battery 130 is discharged and the SOC of the auxiliary battery 130 reaches the second reference SOC (d), the controller 170 may be configured to operate the solar charging panel 110 to supply the power generated from the solar charging panel 110 to the auxiliary battery 130.

As described above, as the auxiliary battery 130 is charged and discharged and the SOC of the auxiliary battery 130 reciprocates between the second reference SOC (d) and the second threshold SOC (e), the high-voltage battery 120 may be charged and the SOC of the high-voltage battery 120 may reach the first reference SOC. The controller 170 may be configured to operate the solar charging panel 110 to supply the power generated from the solar charging panel 110 to the auxiliary battery 130 when the high-voltage battery 120 is charged and the SOC of the high-voltage battery 120 reaches the first reference SOC. When the auxiliary battery 130 is charged and the SOC of the auxiliary battery 130 reaches the maximum SOC (a), the controller 170 may be configured to operate the solar charging panel 110 to supply the power generated from the solar charging panel 110 to the high-voltage battery 120.

Further, when the auxiliary battery 130 is discharged again and the SOC of the auxiliary battery 130 reaches the predetermined normal control lower limit SOC (b), the controller 170 may be configured to operate the solar charging panel 110 to supply the power generated from the solar charging panel 110 to the auxiliary battery 130. The power generated from the solar charging panel 110 may be supplied to the high-voltage battery 120 or the auxiliary battery 130 to charge the batteries 120 and 130 while the starting of the vehicle 1 is off. The charging of the batteries 120 and 130 may be completed when the starting of the vehicle 1 is on (YES in 1350).

As is apparent from the above description, the exemplary embodiments of the present disclosure may increase the fuel efficiency of the vehicle and improve the fuel consumption of the vehicle by supplying the power generated through the solar charging panel to the high-voltage battery or the auxiliary battery based on the SOC of each of the high-voltage battery and the auxiliary battery.

Meanwhile, the exemplary embodiments of the present disclosure may be implemented in the form of recording media for storing instructions to be carried out by a computer. The instructions may be stored in the form of program codes, and when executed by a processor, may generate program modules to perform operation in the embodiments of the present disclosure. The recording media may correspond to non-transitory computer-readable recording media. The non-transitory computer-readable recording medium includes any type of recording medium having data stored thereon that may be thereafter read by a computer. For example, it may be a ROM, a RAM, a magnetic tape, a magnetic disk, a flash memory, an optical data storage device, etc.

The exemplary embodiments of the present disclosure have thus far been described with reference to the accompanying drawings. It will be obvious to those of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

What is claimed is:

1. A vehicle, comprising:
    a motor;
    an electric field load;
    a high-voltage battery configured to supply power to the motor;
    an auxiliary battery configured to supply the power to the electric field load;
    a battery sensor configured to measure a state of charge (SOC) of the high-voltage battery and the SOC of the auxiliary battery;
    a solar charging panel configured to measure an amount of solar light and generate the power based on solar energy; and
    a controller configured to:
        calculate generable power through the solar charging panel based on the measured amount of light when starting of the vehicle is off;
        operate the solar charging panel to generate the power when the generable power is greater than the power consumption in the power generation through the solar charging panel; and
        operate the solar charging panel to supply the generated power to the high-voltage battery or the auxiliary battery based on the SOC of the high-voltage battery and the SOC of the auxiliary battery,
    wherein the controller is configured to operate the solar charging panel to supply the generated power to the high-voltage battery when the auxiliary battery is charged and the SOC of the auxiliary battery reaches the maximum SOC, and operate the solar charging panel to supply the generated power to the auxiliary battery when the auxiliary battery is discharged and the SOC of the auxiliary battery reaches a predetermined normal control lower limit SOC.

2. The vehicle according to claim 1, wherein the controller is configured to operate the solar charging panel to supply the generated power to the auxiliary battery when the SOC of the high-voltage battery is equal to or greater than a predetermined first reference SOC and the SOC of the auxiliary battery is equal to or greater than a predetermined second reference SOC.

3. The vehicle according to claim 2, wherein the controller is configured to operate the solar charging panel to supply the generated power to the high-voltage battery until the auxiliary battery is discharged and the SOC of the auxiliary battery reaches a predetermined first threshold SOC when the SOC of the auxiliary battery is equal to or less than the maximum SOC and is equal to or greater than a predetermined normal control lower limit SOC, and operate the solar charging panel to supply the generated power to the auxiliary battery when the SOC of the auxiliary battery reaches the first threshold SOC.

4. The vehicle according to claim 2, wherein the controller is configured to operate the solar charging panel to supply the generated power to the auxiliary battery when the SOC of the auxiliary battery is less than a predetermined normal control lower limit SOC and is equal to or greater than the second reference SOC.

5. The vehicle according to claim 1, wherein the controller is configured to operate the solar charging panel to supply the generated power to the high-voltage battery when the SOC of the high-voltage battery is less than a predetermined first reference SOC and the SOC of the auxiliary battery is less than a predetermined second reference SOC.

6. The vehicle according to claim 5, wherein the controller is configured to operate the solar charging panel to supply the generated power to the auxiliary battery when the auxiliary battery is discharged and the SOC of the auxiliary battery reaches the second reference SOC.

7. The vehicle according to claim 5, wherein the controller is configured to operate the solar charging panel to supply the generated power to the auxiliary battery when the high-voltage battery is charged and the SOC of the high-voltage battery reaches the first reference SOC.

8. The vehicle according to claim 1, wherein the controller is configured to operate the solar charging panel to supply the generated power to the auxiliary battery when the SOC of the high-voltage battery is equal to or greater than a predetermined first reference SOC and the SOC of the auxiliary battery is less than a predetermined second reference SOC.

9. The vehicle according to claim 1, wherein the controller is configured to operate the solar charging panel to supply the generated power to the auxiliary battery when the SOC of the high-voltage battery is less than a predetermined first reference SOC and the SOC of the auxiliary battery is less than a predetermined second reference SOC.

10. The vehicle according to claim 9, wherein the controller is configured to operate the solar charging panel to supply the generated power to the high-voltage battery when the auxiliary battery is charged and the SOC of the auxiliary battery reaches a predetermined second threshold SOC, and operate the solar charging panel to supply the generated power to the auxiliary battery when the auxiliary battery is discharged and the SOC of the auxiliary battery reaches the second reference SOC.

11. The vehicle according to claim 10, wherein the controller is configured to operate the solar charging panel to supply the generated power to the auxiliary battery when the high-voltage battery is charged and the SOC of the high-voltage battery reaches the first reference SOC.

12. The vehicle according to claim 1, wherein the controller is configured to operate the solar charging panel to supply the generated power to the high-voltage battery when the auxiliary battery is charged and the SOC of the auxiliary battery reaches the maximum SOC, and operate the solar charging panel to supply the generated power to the auxiliary battery when the high-voltage battery is charged and the SOC of the high-voltage battery reaches the maximum SOC.

13. A method for controlling a vehicle which includes a motor, an electric field load, a high-voltage battery configured to supply power to the motor, an auxiliary battery configured to supply the power to the electric field load, a battery sensor configured to measure a state of charge (SOC) of the high-voltage battery and the SOC of the auxiliary battery, and a solar charging panel configured to measure an amount of solar light and generate the power based on solar energy, the method comprising:
    calculating, by a controller, generable power through the solar charging panel based on the measured amount of light when starting of the vehicle is off;
    operating, by the controller, the solar charging panel to generate the power when the generable power is greater than the power consumption in the power generation through the solar charging panel; and operating, by the controller, the solar charging panel to supply the generated power to the high-voltage battery or the auxiliary battery based on the SOC of the high-voltage battery and the SOC of the auxiliary battery, wherein the operating of the solar charging panel includes:

operating, by the controller, the solar charging panel to supply the generated power to the high-voltage battery when the auxiliary battery is charged and the SOC of the auxiliary battery reaches the maximum SOC; and operating, by the controller, the solar charging panel to supply the generated power to the auxiliary battery when the auxiliary battery is discharged and the SOC of the auxiliary battery reaches a predetermined normal control lower limit SOC.

14. The method according to claim 13, wherein the operating of the solar charging panel includes:

operating, by the controller, the solar charging panel to supply the generated power to the auxiliary battery when the SOC of the high-voltage battery is equal to or greater than a predetermined first reference SOC and the SOC of the auxiliary battery is equal to or greater than a predetermined second reference SOC.

15. The method according to claim 14, wherein the operating of the solar charging panel includes:

operating, by the controller, the solar charging panel to supply the generated power to the high-voltage battery until the auxiliary battery is discharged and the SOC of the auxiliary battery reaches a predetermined first threshold SOC when the SOC of the auxiliary battery is equal to or less than the maximum SOC and is equal to or greater than a predetermined normal control lower limit SOC; and operating, by the controller, the solar charging panel to supply the generated power to the auxiliary battery when the SOC of the auxiliary battery reaches the first threshold SOC.

16. The method according to claim 14, wherein the operating of the solar charging panel includes:

operating, by the controller, the solar charging panel to supply the generated power to the auxiliary battery when the SOC of the auxiliary battery is less than a predetermined normal control lower limit SOC and is equal to or greater than the second reference SOC.

17. The method according to claim 13, wherein the operating of the solar charging panel includes:

operating, by the controller, the solar charging panel to supply the generated power to the high-voltage battery when the SOC of the high-voltage battery is less than a predetermined first reference SOC and the SOC of the auxiliary battery is less than a predetermined second reference SOC.

18. The method according to claim 17, wherein the operating of the solar charging panel includes:

operating, by the controller, the solar charging panel to supply the generated power to the auxiliary battery when the auxiliary battery is discharged and the SOC of the auxiliary battery reaches the second reference SOC.

* * * * *